July 21, 1942.  H. E. GOLDSTINE  2,290,587
PHASE MODULATOR
Filed March 14, 1939   2 Sheets-Sheet 1
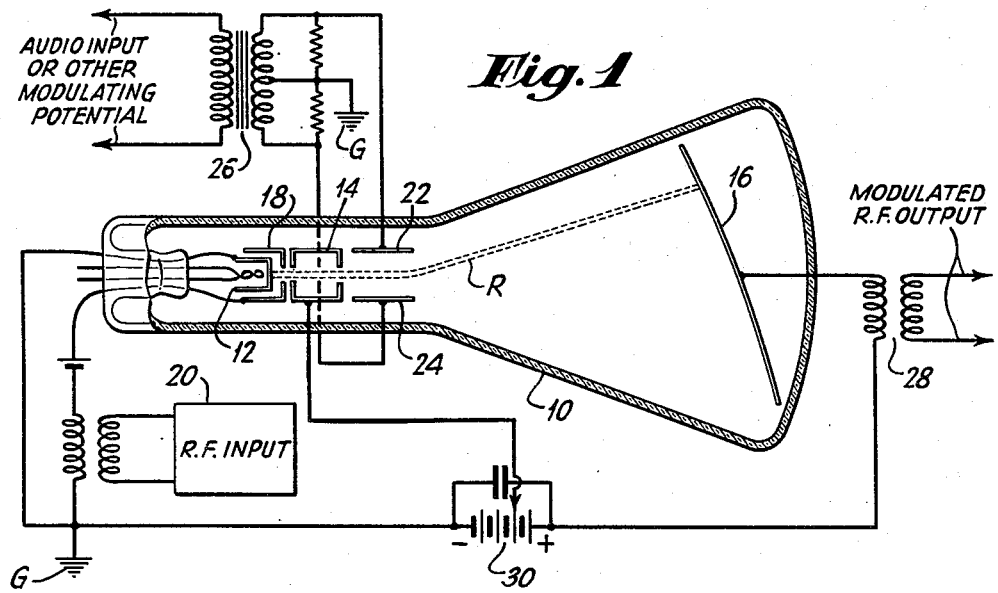
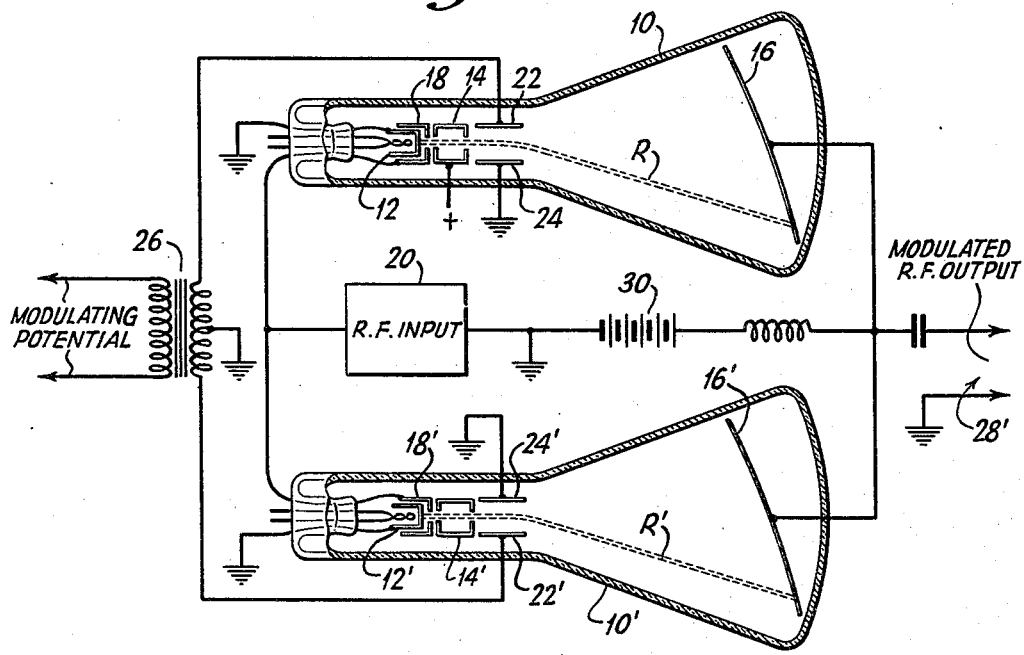
INVENTOR.
H. E. GOLDSTINE
BY
ATTORNEY.

July 21, 1942.  H. E. GOLDSTINE  2,290,587
PHASE MODULATOR
Filed March 14, 1939  2 Sheets-Sheet 2
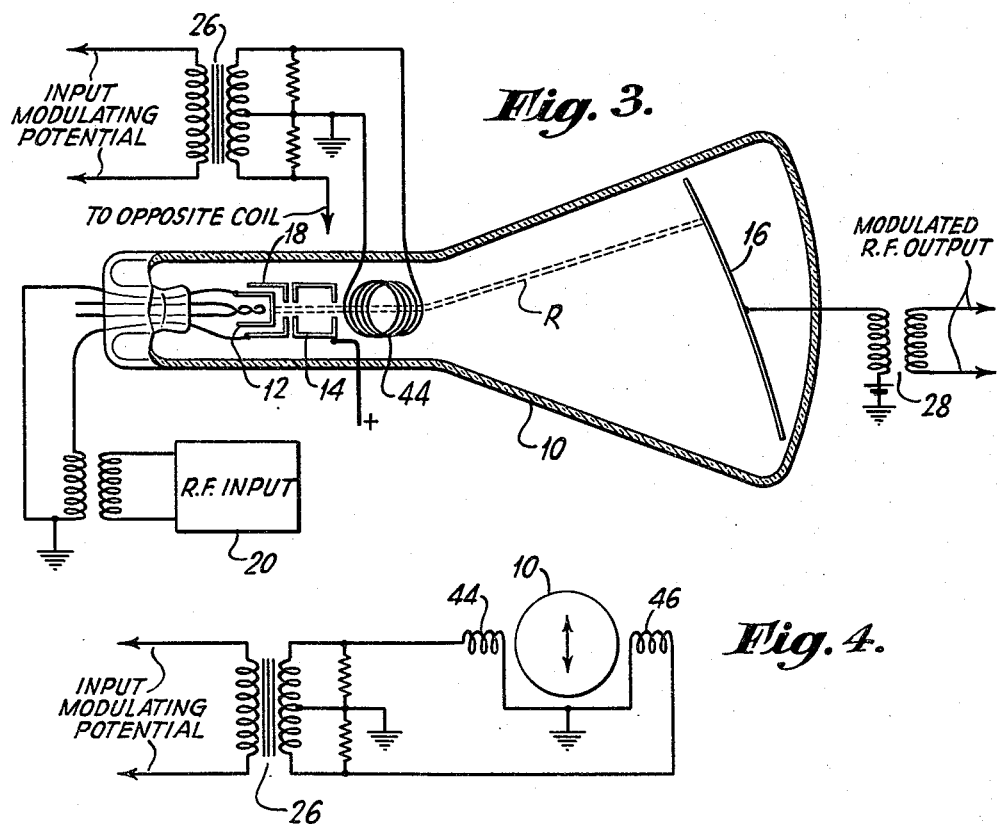
INVENTOR.
H. E. GOLDSTINE
BY
ATTORNEY.

Patented July 21, 1942

2,290,587

UNITED STATES PATENT OFFICE 2,290,587

PHASE MODULATOR

Hallan E. Goldstine, Port Jefferson, N. Y., assignor to Radio Corporation of America, a corporation of Delaware Application March 14, 1939, Serial No. 261,729

10 Claims. (Cl. 179—171.5)

The advantages of using phase modulation, such as the resultant gain in power, as compared to some types of modulation, are known in the art.

The present invention concerns a new and improved means for phase modulating wave energy.

In its broadest aspect, my invention accomplishes phase modulation by using a tube somewhat similar to the present cathode ray tube. The tube utilized in my present invention may, however, be of the metal type, because there is no particular reason for having a screen open to view, as in the oscilloscope of other similar devices.

In accordance with my invention, wave energy to be phase modulated is impressed on the control grid of the cathode ray tube, or one of its other electrodes. The target anode of the cathode ray tube is so shaped or so disposed that as the cathode ray is deflected the time of travel of the electron ray or beam changes. That is to say, the length of the beam is varied in accordance with deflections thereof, with a resultant change in phase of the wave energy set up in any output circuit connected with the target or anode.

By putting a modulating potential on the deflecting electrode or electrodes the beam or ray may be made to change its position on the target or screen, thus altering the length of the ray or time of travel of the electrons thereof, thereby changing the phase of the voltage derived from the target electrode.

The beam may be either electromagnetically or electrostatically deflected, and by changing the accelerating voltage the time of travel or the actual phase lag between one point on the target and another may be altered.

In a modification, two cathode ray tubes are arranged in a push-pull circuit, so that they may be differentially modulated at their inputs, with their outputs connected in parallel to derive the resultant change in phase of the output energy and simultaneously cancel any undesired amplitude modulation thereof.

In all of the modifications, the electron beam may be, of a fan shape rather than a pencil beam as is usually used in cathode ray guns, so that the tube may be capable of handling higher power, due to the greater number of electrons.

In describing my invention, reference will be made to Figures 1 to 4, inclusive, wherein I have illustrated by circuit diagrams the essential elements of several phase modulators arranged in accordance with my invention. In Figure 4 I have shown magnetic field producing means for deflecting the electron beam, which magnetic field producing means may replace the electric field producing means of Figures 1 and 2.

In Figure 1 a cathode ray gun or tube 10 has a cathode 12 associated with a ray producing or guiding and accelerating electrode 14. The ray travels towards a target 16, located on the arc of a circle having its point of origin off the axis of the tube and its concave surface facing the cathode. The cathode ray gun 10 also has a grid electrode 18, to which wave energy to be phase modulated may be supplied from a source 20. The deflecting electrodes 22 and 24 have their potentials modulated in opposition by the signal potentials to be impressed on the wave energy. The signal potentials supplied to electrodes 22 and 24 may be derived as shown, from any source connected with a transformer 26, the midpoint of the secondary winding of which is grounded at G. The anode electrode or target 16 is connected with the radio frequency output circuit 28. This output circuit has its return terminal connected to the cathode and to ground G, if desired. The beam forming and accelerating means represented at 14 may include the necessary source of potential, or, if desired, a source of potential 30 may be connected, as shown, between the anode electrode 16 and ground and the cathode 12 and to electrode 14.

In operation, electron gun 10 is energized to produce a ray R falling on the anode 16. Radio frequency potential is supplied at 20 and is impressed by grid 18 on the ray to appear in the output circuit 28. The modulating potentials are applied on deflecting electrodes 22 and 24, so that the ray R is deflected across the target 16 to thereby vary its length and the time of travel of the electrons, in accordance with the modulating potentials. The phase of the radio wave in the circuit is a function of the electrical length of the circuit. As a consequence, the phase of the wave energy supplied at 28 to any utilization circuit is varied in phase in accordance with the modulating potentials.

In the modification shown in Figure 2 a pair of tubes or guns, 10 and 10', are utilized. These tubes are similar to the single tube used in Figure 1, and the numerals used in Figure 1 have been applied to corresponding elements in one of the tubes in Figure 2. Corresponding numerals primed have been applied to the elements of the other tube in Figure 2.

In connection with Figure 2, it is noted that the modulating potentials are now supplied in push-pull relation or differentially to an electrode in each electron gun, the other electrode in each gun being grounded or connected directly with the midpoint of the secondary winding of 26. The radio frequency potentials are applied in phase to the control electrodes 18 and 18'. The directions of deflection of the rays R in both guns are controlled, as shown, so that amplitude variations of the wave energy supplied to the output 28' oppose and are cancelled while the phase variations in the wave energy caused by changes in time of travel of the streams R and R' are in synchronism to produce in the output 28 phase modulated wave energy substantially free of amplitude variations. Note that the deflecting electrodes are so connected to the secondary of transformer 26 that the rays R and R' increase in length simultaneously and decrease in length simultaneously.

The phase modulated wave energy may be used directly from outputs 28 and 28' or may be amplified and/or multiplied and/or limited before using.

The deflecting plates 22 and 24 of Figures 1 and 2 may be replaced by solenoids 44 and 46 connected with a modulating potential source, as illustrated in Figures 3 and 4. That is, solenoids may be used to produce or set up a field through which the electron ray travels, which field waxes and wanes in strength and changes in direction of polarity in accordance with the strength and polarity, respectively, of the modulating potentials.

What is claimed is:

1. In a wave length modulation system in combination, means for producing a ray of electrons and projecting the same along a predetermined path, a target electrode comprising electron collecting means in a surface inclined to said predetermined path, ray deflecting means adjacent the path between said ray producing means and target, a control grid in the path of said ray, a source of signalling potentials coupled to said control grid for controlling the intensity of the electrons flowing from said ray producing means to said target in accordance with said signalling potentials, and another source of signalling potentials coupled to said deflecting means for deflecting said ray in accordance with said other signalling potentials to cause said ray to reach said collecting means of said target over a path the length of which changes, to produce in said target output potentials characteristic of one of said signalling potentials varied in wave length in accordance with the other of said signalling potentials.

2. In a wave length modulation system a cathode ray tube having an electron beam producing and propagating means, a target having a surface inclined to the normal path of said beam so that points thereon are different distances from said beam producing means, said target being in the path of said beam, deflecting means adjacent the path of said beam, a control grid in said tube, means for applying oscillating voltages of one frequency to said control grid, means for applying oscillating voltages of another frequency to said deflecting means whereby said electron beam is caused to move over said target in accordance with said oscillating voltages of said second frequency, and means for deriving oscillatory energy from said target.

3. In a phase modulation system in combination, means for producing a pair of rays of electrons and causing the same to travel over target electrodes, said target electrodes having surface points on which are different distances from the respective ray producing means, a deflecting means adjacent the path of travel of each ray, means for controlling the intensity of the electron ray reaching said target electrodes in accordance with signalling potentials, and means for applying other potentials to said deflecting means whereby said rays are deflected over the surface of said targets to produce therein potentials characteristic of one of said signalling potentials varied in phase in accordance with the other of said potentials.

4. In a phase modulation system a cathode ray tube having, an electron beam producing and propagating means, a target having a surface inclined to the normal path of said beam so that points on said surface are different distances from said beam producing means, said target being in the path of said beam, a pair of beam deflecting elements adjacent the path of said beam, a control grid in said tube, circuits for applying oscillating voltages of one frequency to said control grid, circuits for applying oscillating voltages of another frequency to said beam deflecting elements whereby said electron beam is caused to move on said target in accordance with said second voltages, and means for deriving oscillatory energy from said target.

5. In a phase modulation system a cathode ray tube having, an electron beam producing and propagating means, a target having a surface points on which are different distances from said beam producing means, said target being in the path of said beam, magnetic deflecting means adjacent the path of said beam, a control grid in said tube, means for applying oscillating voltages of one frequency to said control grid, means for applying oscillating voltages of another frequency to said deflecting means whereby said electron beam is caused to move across said target in accordance with said second potential, and means for deriving oscillatory energy from said target.

6. In a phase modulation system, an electron ray producing means including ray focussing means, a target in the form of an inclined surface located in the path of said ray, ray deflecting plates maintained adjacent the path of said ray, means for applying modulating potentials to said deflecting plates, means for varying the intensity of said ray in accordance with oscillations of carrier wave frequency, and an output circuit connected with said target.

7. In a modulation system, an electron ray producing means including ray focussing means, a target comprising an arcuate surface located in the path of said ray, deflecting means located about the path of said ray, means for applying modulating potentials to said deflecting means, means for varying the intensity of said ray at carrier frequency, and an output circuit connected with said target.

8. In a wave length modulation system in combination, an electron emission element for producing a ray of electrons and projecting the same along a predetermined path, a target electrode comprising a curved surface tangent to a plane inclined to said predetermined path, ray deflecting windings adjacent the path between said ray producing element and target, a control electrode in the path of said ray, a source of oscillations of carrier wave frequency coupled to said control electrode for controlling the flow of electrons between said ray producing element and target in accordance with oscillations of carrier wave frequency, and circuits for applying modulating potentials to said deflecting windings whereby said ray is deflected, and reaches said curved surface of said target over a path the length of which changes to produce in said target output potentials characteristic of said carrier wave frequency potentials varied in wave length in accordance with said modulating potentials.

9. In a wave length modulation system, a cathode ray tube having an electron beam producing and propagating means, a target having an arcuate surface the origin of which is at a point located at one side of the path of said beam, said target being in the path of said beam, deflecting means adjacent the path of said beam, a control grid in said tube, means for applying voltages of carrier wave frequency to said control grid, means for applying modulating potentials to said deflecting means whereby said electron beam is caused to move over said arcuate surface of said target in accordance with said modulating potentials, and means for deriving oscillatory energy from said target.

10. In a wave length modulation system, an electron discharge device having an electron emitting electrode and a target electrode to which said emitted electrons are attracted, electron path control means for said device for controlling solely the course said electrons follow to said target to thereby control solely the transit time of the electrons from said emitting electrode to said target, a control electrode for said device for varying solely the intensity of the electrons flowing through said device to said target, a source of modulating potentials coupled to said electron path control means, a source of wave energy of carrier wave frequency coupled to said control electrode, and an output circuit coupled to said target electrode.

HALLAN E. GOLDSTINE.